United States Patent
Imazeki

(10) Patent No.: US 9,081,434 B2
(45) Date of Patent: Jul. 14, 2015

(54) TOUCH PANEL AND MANUFACTURING METHOD THEREFOR

(71) Applicant: Japan Display Inc., Tokyo (JP)

(72) Inventor: Yoshikatsu Imazeki, Nagano (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/190,954

(22) Filed: Feb. 26, 2014

(65) Prior Publication Data

US 2014/0176832 A1    Jun. 26, 2014

Related U.S. Application Data

(63) Continuation of application No. 13/048,092, filed on Mar. 15, 2011, now Pat. No. 8,692,787.

(30) Foreign Application Priority Data

Mar. 17, 2010  (JP) ................ P2010-060319

(51) Int. Cl.
G06F 3/041 (2006.01)
G06F 3/044 (2006.01)

(52) U.S. Cl.
CPC ............ G06F 3/041 (2013.01); G06F 3/044 (2013.01)

(58) Field of Classification Search
CPC combination set(s) only.
See application file for complete search history.

(56) References Cited

U.S. PATENT DOCUMENTS

| 2008/0266273 | A1  | 10/2008 | Slobodin et al. |
| 2009/0244028 | A1  | 10/2009 | Matsuo |
| 2009/0303195 | A1* | 12/2009 | Yamato et al. ............. 345/173 |
| 2010/0013785 | A1  | 1/2010  | Murai et al. |

FOREIGN PATENT DOCUMENTS

| CN | 101558370 | 10/2009 |
| JP | 2009-259203 | 11/2009 |

OTHER PUBLICATIONS

Chinese Office Action issued Nov. 3, 2014 in corresponding Chinese Application No. 201110057058.6.

* cited by examiner

*Primary Examiner* — Charles V Hicks
(74) *Attorney, Agent, or Firm* — K&L Gates LLP

(57) ABSTRACT

Disclosed herein is a touch panel including a glass cover, a light transmitting conductive film, a flexible circuit board, a light blocking print layer, and a colored print layer.

8 Claims, 8 Drawing Sheets

TOUCH PANEL AND MANUFACTURING METHOD THEREFOR

CROSS REFERENCES TO RELATED APPLICATIONS

The present application is a continuation of U.S. patent application Ser. No. 13/048,092, filed Mar. 15, 2011, which application claims priority to Japanese Priority Patent Application JP 2010-060319 filed in the Japan Patent Office on Mar. 17, 2010, the entire content of which is hereby incorporated by reference.

BACKGROUND

This application relates to a touch panel wherein an input position detecting electrode is formed on a glass cover and a manufacturing method for the touch panel.

While various types of touch panels are known, for example, in a touch panel of the capacitance type, a light transmitting input position detecting electrode is formed on one face of a glass substrate. The input position detecting electrode is formed in an inputting region at a central portion of the glass substrate while a peripheral wiring line is formed at a peripheral position of the glass substrate on the outer side of the inputting region. Further, in the touch panel of the capacitance type, a light transmitting glass cover is adhered to the side of the glass substrate, for which an inputting operation is carried out, by a bonding agent. A touch panel of the type described is disclosed, for example, in Japanese Patent Laid-Open No. 2009-259203.

SUMMARY

If a touch panel is configured such that an input position detecting electrode and a peripheral wiring line are formed on a second face of a glass cover opposite to a first face for which an inputting operation is carried out, then a glass substrate separate from the glass cover can be omitted. Therefore, the touch panel of the configuration just described is advantageous in that reduction of the number of parts can be anticipated and reduction in thickness and weight can be anticipated.

However, in the case where the peripheral wiring line is formed on the second face of the glass cover, a flexible circuit board is connected to the second face side of the glass cover. Therefore, when the touch panel is viewed from the input operation face, that is, from the first face, of the glass cover, a connecting portion of the flexible circuit board is visible, and there is a problem that the outward appearance of the touch panel is deteriorated significantly.

Meanwhile, a touch panel is sometimes configured such that, in order to assure a good outward appearance thereof, a colored print layer is provided in a peripheral region of the second face side of the glass cover. Accordingly, it seems a possibly good structure to form a colored print layer on a lower layer side than the peripheral wiring line to hide the mounting portion of the flexible circuit board. However, in order to provide a colored print layer on the lower layer side than the peripheral wiring line on the glass cover, the colored print layer is first formed on the overall peripheral region including the mounting region, and then the input position detecting electrode in the inputting region and a light transmitting conductor film, which configures the peripheral wiring line, are formed. Therefore, there is a problem that, upon formation of the light transmitting conductor film, the transparency of the light transmitting conductor film is degraded significantly by outgas generated from the colored print layer.

Therefore, it is desirable to provide a touch panel which can prevent significant degradation of the transparency of a light transmitting conductor film, which configures an input position detecting electrode, even in the case where a connecting portion of a flexible circuit board to a glass cover is hidden with the print layer on the lower layer side and a manufacturing method for the touch panel.

According to an embodiment, there is provided a touch panel including a glass cover, a light transmitting conductive film formed on a second face side of the glass cover opposite to a first face of an inputting operation face side and configuring an input position detecting electrode in an inputting region and a peripheral wiring line extending in a peripheral region on the outer side with respect to the inputting region to a mounting region, a flexible circuit board electrically connected to an end portion of the peripheral wiring line in the mounting region, a light blocking print layer formed on the second face side of the glass cover in an overlapping relationship with an overlapping region between the flexible circuit board and the glass cover on a lower layer side with respect to the peripheral wiring line, and a colored print layer formed on the second face side of the glass cover in the peripheral region on the upper layer side of the peripheral wiring line.

According to another embodiment, there is provided a manufacturing method for a touch panel, including a light transmitting conductive film forming step of forming, on a second face side of a glass cover on the opposite side to a first face of an inputting operation face side, a light transmitting conductive film which configures an input position detecting electrode in an inputting region and a peripheral wiring line extending from a peripheral region on the outer side with respect to the inputting region to a mounting region, a mounting step of connecting a flexible circuit board to the mounting region, a first printing step of forming, prior to the light transmitting conductive film forming step, a light blocking print layer overlapping with an overlapping region between the flexible circuit board and the glass cover, and a second printing step of forming a colored print layer in the peripheral region after the light transmitting conductive film forming step.

In the touch panel and the manufacturing method for a touch panel, the "upper layer side" and the "lower layer side" are used to signify a positional relationship of a plurality of layers formed on the second face of the glass cover irrespective of the upward or downward direction of the touch panel. Therefore, the "lower layer side" signifies the side nearer to the glass cover, that is, the side formed at a preceding step, and the "upper layer side" signifies the side far from the glass cover, that is, the side to be formed at a succeeding step. Further, the "colored print layer" signifies any print layer other than a transparent print layer.

In the present application, the input position detecting electrode and the peripheral wiring line are formed on the second face side on the opposite side to the first face of the input operation face side of the glass cover, and the structure wherein the input position detecting electrode and the peripheral wiring line are formed on a glass substrate separate from the glass cover is not adopted. Therefore, a glass substrate separate from the glass cover is not required, and consequently, reduction of the number of parts can be achieved and reduction in thickness and weight of the touch panel can be anticipated. Further, while the flexible circuit board is connected to the second face side of the glass cover, the light blocking print layer which overlaps with the overlapping region between the flexible circuit board and the glass cover is formed on the lower layer side with respect to the peripheral wiring line. Therefore, the flexible circuit board is not visible from the input operation face side, that is, from the first face side, of the glass cover. Further, while, on the second face side of the glass cover, the colored print layer is formed in the peripheral region, the colored print layer is formed on the upper layer side with respect to the peripheral wiring line. Therefore, when the light transmitting conductive film which configures the input position detecting electrode and the peripheral wiring line is to be formed, what is formed on the glass cover is only the light blocking print layer from between the light blocking print layer and the colored print layer. Further, the light blocking print layer is formed in a narrow region which overlaps with the overlapping region between the flexible circuit board and the glass cover. Therefore, when the light transmitting conductive layer is formed, outgas to be generated from the print layers can be suppressed to the minimum, and consequently, the light transmitting conductive film can be formed so as to have high transparency. Therefore, the presence of the input position detecting electrode does not stand out, and when an image is displayed through the touch panel, the image can be displayed with high quality.

Preferably, the light blocking print layer has a thickness smaller than that of the colored print layer. Or preferably, the light blocking print layer has a thickness smaller than 10 μm. If the light blocking print layer is formed thin in this manner, then since outgas to be generated from the light blocking print layer when the light transmitting conductive film is to be formed can be suppressed to a small amount, the light transmitting conductive film can be formed with high transparency. Further, although the light blocking print layer is placed on the peripheral wiring line, since the thickness of the light blocking print layer is small, there is an advantage also in that an offset cut or disconnection of the wiring line arising from the light blocking print layer becomes less likely to occur.

Preferably, the colored print layer partially overlaps with the light blocking print layer. In the case where the touch panel is configured in this manner, the entire peripheral region can be used as a formation region for the colored print layer or the light blocking print layer. Consequently, since no gap is provided between the colored print layer and the light blocking print layer, the touch panel can be provided with improved outward appearance.

In this instance, the touch panel may be configured such that the colored print layer covers a portion of the flexible circuit board which overlaps with the glass cover.

Or, the touch panel may be configured such that the colored print layer partially overlaps with the light blocking print layer without overlapping with the flexible circuit board.

Preferably, the glass cover is made of tempered glass. With the configuration just described, reduction in thickness of the glass cover can be achieved. Therefore, the touch panel can be configured with a reduced thickness and weight.

Additional features and advantages are described herein, and will be apparent from the following Detailed Description and the figures.

DETAILED DESCRIPTION

Embodiments of the present application will be described below in detail with reference to the drawings.

In the following, preferred embodiments of the present application are described with reference to the accompanying drawings. It is to be noted that, in the figures referred to in the following description, in order to show various layers and members in respective sizes with which they can be recognized on the drawings, the scales of them are suitably made different from each other. Further, in FIGS. 1A, 1B and 3A to 5B referred in the following description, the inputting operation face side is directed upwardly in order to facilitate correspondence among the figures. Therefore, the glass cover is shown such that the second face thereof is directed downwardly. However, in the description given hereinbelow of a positional relationship among a plurality of layers formed on the second face of the glass cover, the side nearer to the glass cover, that is, the side formed at a preceding step, is referred to as "lower face side" while the side far from the glass cover, that is, the side to be formed at a succeeding step, is referred to as "upper face side."

Embodiment 1

Figure 1A:
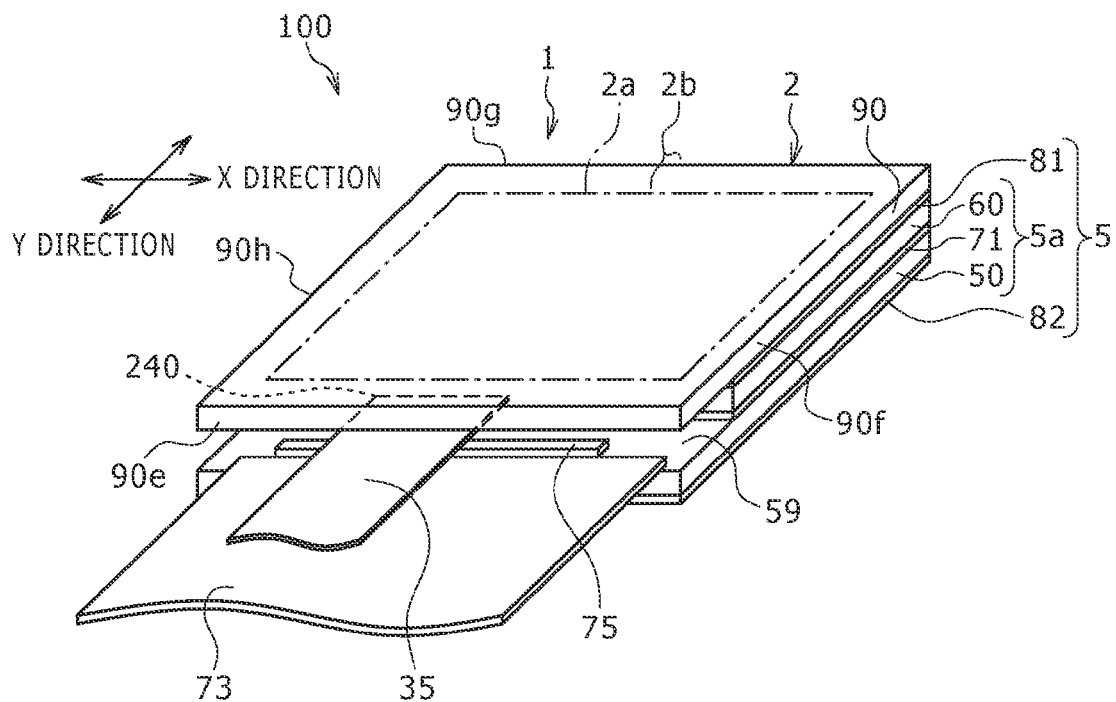
FIGS. 1A and 1B are a schematic perspective view and a sectional view, respectively, showing an electro-optical apparatus with an inputting function which includes a touch panel according to an embodiment 1 of the present application.
Figure 1B:
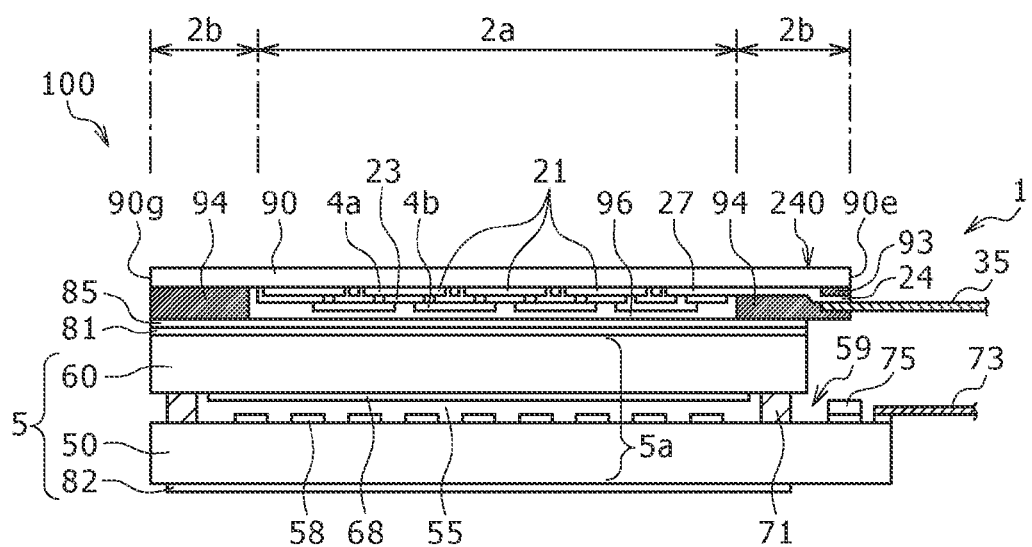

General Configuration of the Electro-Optical Apparatus with an Inputting Function FIGS. 1A and 1B show an electro-optical apparatus with an inputting function which includes a touch panel according to an embodiment 1 of the present application. More particularly, FIGS. 1A and 1B are a perspective view and a sectional view, respectively, of the electro-optical apparatus with an inputting function.

Referring to FIGS. 1A and 1B, the electro-optical apparatus 100 with an inputting function in the present embodiment includes an image production apparatus 5 which may be configured from a liquid crystal apparatus or the like, and a touch panel 1 disposed in an overlapping relationship on a face of the image production apparatus 5 from which display light is emitted. The image production apparatus 5 and the touch panel 1 are adhered to each other by a bonding agent layer 85 or the like. The image production apparatus 5 includes a liquid crystal panel in the form of an electro-optical panel 5a as a display panel. In the present embodiment, both of the touch panel 1 and the electro-optical panel 5a have a rectangular shape in plan, and a central region when the touch panel 1 and the electro-optical apparatus 100 with an inputting function are viewed in plan is an inputting region 2a. Meanwhile, a region in which the image production apparatus 5 and the electro-optical apparatus 100 with an inputting function overlap with the inputting region 2a in plan is an image forming region. A mounting region 240 is provided at an end portion 90e of the touch panel 1, and a flexible circuit board 35 is connected at an end portion thereof to the mounting region 240. Meanwhile, another flexible circuit board 73 is connected at an end portion thereof to the side of the electro-optical panel 5a on which the end portion 90e of the touch panel 1 is positioned.

The image production apparatus 5 is an active matrix liquid crystal display apparatus of the transmission type or the semi-transmissive reflection type, and a backlight apparatus not shown is disposed on the opposite side of the electro-optical panel 5a to the side on which the touch panel 1 is disposed, that is, on the side opposite to the display light emitting side. The backlight apparatus includes, for example, a light transmitting light guide plate disposed in an overlapping relationship on the opposite side of the electro-optical panel 5a to the side on which the touch panel 1 is disposed, and a light source such as a light emitting diode for emitting white light or the like toward a side end portion of the light guide plate. Light emitted from the light source is introduced into the side end portion of the light guide plate, propagates in the light guide plate and goes out from the light guide plate toward the electro-optical panel 5a. Between the light guide plate and the electro-optical panel 5a, a sheet-like optical member such as a light diffusing sheet or a prism sheet is sometimes interposed.

In the image production apparatus 5, a first polarizing plate 81 is disposed in an overlapping relationship on the display light emitting side of the electro-optical panel 5a, and a second polarizing plate 82 is disposed in an overlapping relationship on the opposite side of the electro-optical panel 5a. The electro-optical panel 5a includes a light transmitting element substrate 50 disposed on the opposite side to the display light emitting side thereof, and a light transmitting opposing substrate 60 disposed in an opposing relationship on the element substrate 50 on the display light emitting side. The opposing substrate 60 and the element substrate 50 are adhered to each other by a seal member 71 of a rectangular framework shape, and a liquid crystal layer 55 is held in a region surrounded by the seal member 71 between the opposing substrate 60 and the element substrate 50. On the face of the element substrate 50 opposing to the opposing substrate 60, a plurality of pixel electrodes 58 are formed from a light transmitting conductive film such as an ITO (Indium Tin Oxide) film or an IZO (Indium Zinc Oxide) film. On the face of the opposing substrate 60 opposing to the element substrate 50, a common electrode 68 is formed from a light transmitting conductive film such as an ITO film. Further, a color filter is formed on the opposing substrate 60. It is to be noted that, in the case where the image production apparatus 5 is of the IPS (In Plane Switching) type or the FFS (Fringe Field Switching) type, the common electrode 68 is provided on the element substrate 50 side. Further, the element substrate 50 is sometimes disposed on the display light emitting side of the opposing substrate 60. In an overhanging portion 59 of the element substrate 50 which overhangs from an edge of the opposing substrate 60, a driving IC 75 is COG-mounted, and the flexible circuit board 73 is connected to the overhanging portion 59. It is to be noted that, on the element substrate 50, a driving circuit is sometimes formed together with switching elements on the element substrate 50.

General Configuration of the Touch Panel 1

The touch panel 1 includes a glass cover 90 on the inputting operation face side thereof. In the present embodiment, the glass cover 90 is made of chemically tempered glass. Such chemically tempered glass is obtained by immersing glass in molten potassium salt bath of a temperature of approximately 400° C. to carry out a chemically tempering process. In the chemically tempered glass, sodium ions are exchanged by potassium ions. Here, while the ion diameter of sodium is 95 nm, the ion diameter of potassium is 133 nm. Thus, the potassium ions have a greater ion diameter than the sodium ions. Therefore, the glass substrate is in a state in which the strength thereof is strengthened by the compression stress originating from the chemically tempered film on the surface thereof. Accordingly, the glass cover 90 in the present embodiment is approximately 0.2 mm thick and is very thin.

As seen in FIG. 1B, on the second face 90b side of the glass cover 90 positioned on the opposite side to the first face 90a, although details are hereinafter described, a light blocking print layer 93, a first light transmitting conductive film 4a, an interlayer insulating film 23, a second light transmitting conductive film 4b and a top coat layer 96 are formed in this order from the lower layer side to the upper layer side. Further, in a peripheral region 2b, a colored print layer 94 is formed on the upper layer side of the first light transmitting conductive film 4a, and a region surrounded by the colored print layer 94 makes the inputting region 2a.

In the touch panel 1 configured in such a manner as described above, from between the first light transmitting conductive film 4a and the second light transmitting conductive film 4b, the first light transmitting conductive film 4a forms a plurality of input position detecting electrodes 21 in the inputting region 2a and a plurality of peripheral wiring lines 27 extending from the inputting region 2a toward the mounting region 240 in the peripheral region 2b. Further, to the end portion 90e from among end portions 90e, 90f, 90g and 90h of the glass cover 90, the flexible circuit board 35 is connected on the second face 90b side, and the flexible circuit board 35 is electrically connected to mounting terminals 24 formed from end portions of the peripheral wiring lines 27.

Between the touch panel 1 and the electro-optical panel 5a, a conductive film for shielding formed from a light transmitting film on which a light transmitting conductive film such as an ITO film is formed is sometimes disposed. The conductive film has a function of preventing a potential variation on the image production apparatus 5 side from having an influence as noise on the input position detecting electrodes 21. It is to be noted that, in the case where a sufficient distance can be assured between the image production apparatus 5 and the input position detecting electrodes 21, the conductive film may be omitted.

Configuration in Plan of the Touch Panel 1

Figure 2A:
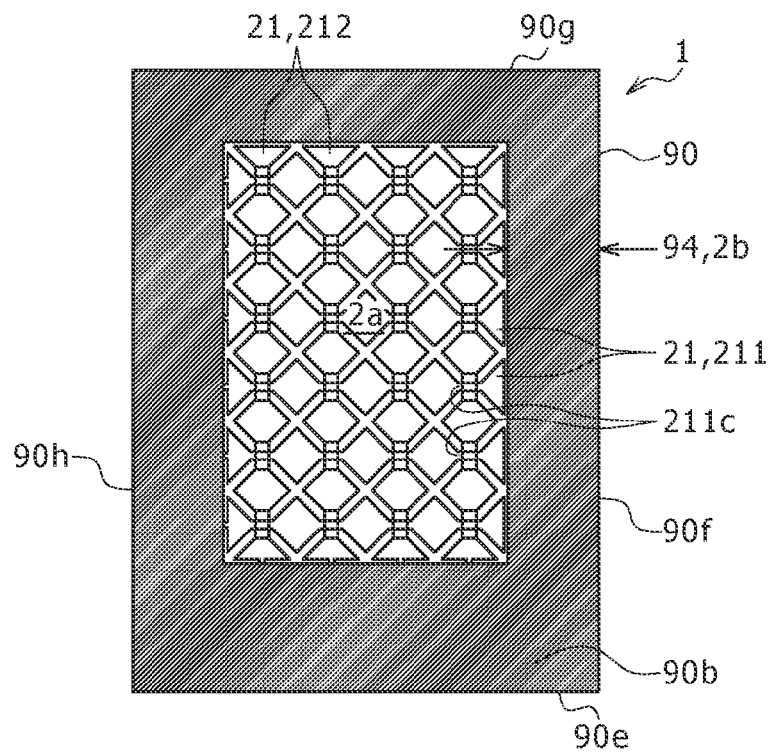
FIGS. 2A and 2B are schematic plan views showing a configuration in plan of different portions of the touch panel of FIGS. 1A and 1B.
Figure 2B:
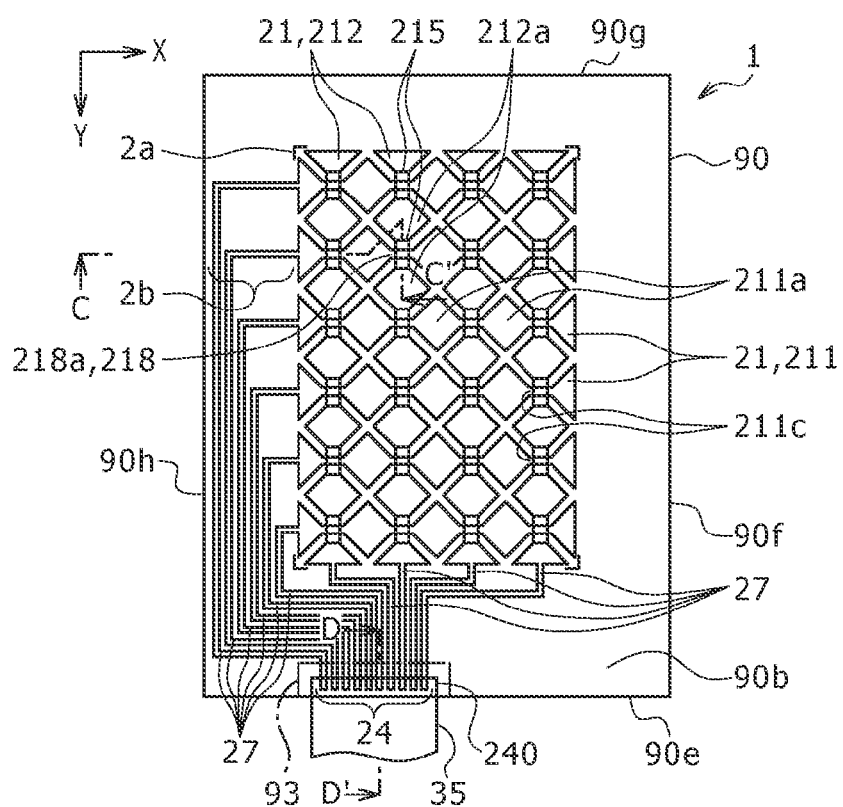

FIGS. 2A and 2B show a configuration in plan of different portions of the touch panel 1 according to the embodiment 1 of the present application. More particularly, FIG. 2A shows a configuration in plan of the colored print layer 94 and so forth formed on the glass cover 90, and FIG. 2B shows a configuration in plan of the input position detecting electrodes 21 and so forth formed on the glass cover 90. It is to be noted that, in FIG. 2B, the inputting region 2a is indicated by L-shaped marks which individually represent the positions of the four corners thereof.

Referring to FIGS. 2A and 2B, in the touch panel 1 of the present embodiment, a plurality of first electrodes 211 for input position detection extending in an X direction or first direction in the inputting region 2a and a plurality of second electrodes 212 for input position detection extending in a Y direction or second direction crossing with the X direction in the inputting region 2a are provided on the second face 90b side of the glass cover 90. The input position detecting electrodes 21 are formed from the first electrodes 211 and the second electrodes 212. Meanwhile, peripheral wiring lines 27 extending from one side end portion of the first electrodes 211 and peripheral wiring lines 27 extending from one side end portion of the second electrodes 212 are formed in the peripheral region 2b on the second face 90b of the glass cover 90. End portions of the peripheral wiring lines 27 which are positioned in the mounting region 240 configure the mounting terminals 24.

Cross Sectional Structure of the Touch Panel 1

Figure 3A:
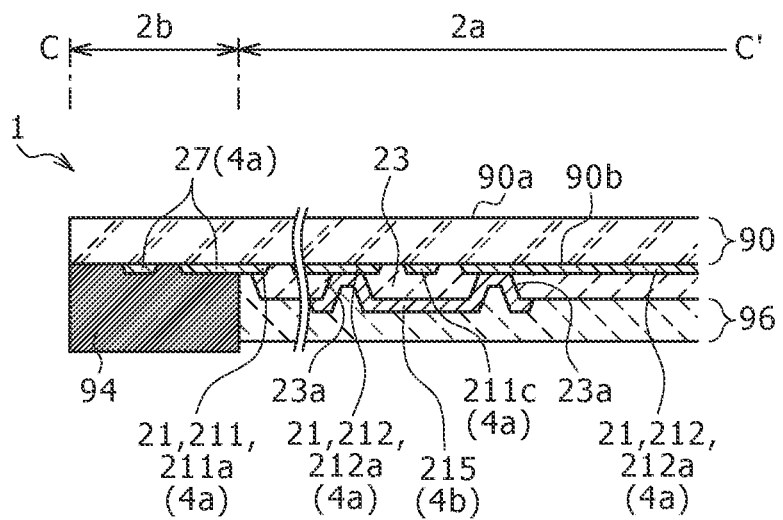
FIGS. 3A and 3B are sectional views showing a cross sectional configuration of different portions of the touch panel of FIGS. 1A and 1B.
Figure 3B:
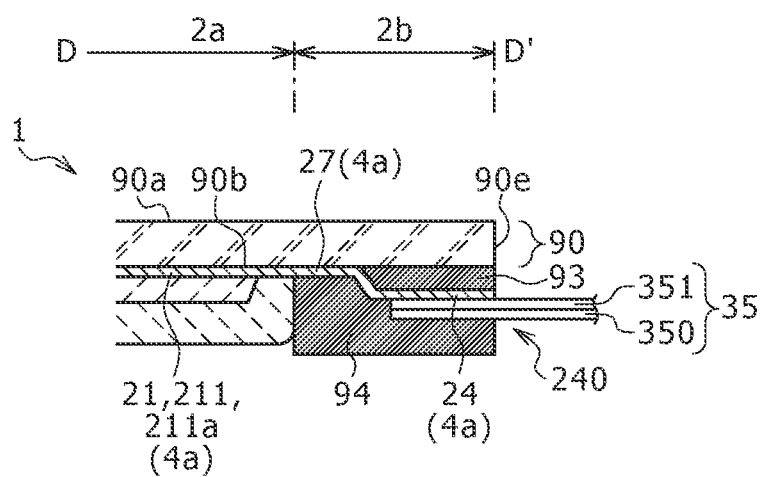

FIGS. 3A and 3B show a cross sectional configuration of different portions of the touch panel 1 according to the embodiment 1 of the present application. More particularly, FIG. 3A is a cross sectional view of the touch panel 1 taken along line C-C' of FIG. 2B, and FIG. 3B is a cross sectional view of the touch panel 1 taken along line D-D' of FIG. 2B.

Referring to FIGS. 2A, 2B, 3A and 3B, the light blocking print layer 93 of a black color, first light transmitting conductive film 4a, light transmitting interlayer insulating film 23, second light transmitting conductive film 4b and top coat layer 96 made of a light transmitting photosensitive resin or the like are formed in this order from the lower layer side to the upper layer side on the second face 90b side of the glass cover 90. Further, in the peripheral region 2b, the colored print layer 94 of a black color is formed on the upper face side of the first light transmitting conductive film 4a.

The first light transmitting conductive film 4a is formed from a polycrystalline ITO film, and the interlayer insulating film 23 formed from a light transmitting insulating film such as a photosensitive resin film or a silicon oxide film is formed on the upper layer side of the first light transmitting conductive film 4a. In the present embodiment, also the second light transmitting conductive film 4b is formed from a polycrystalline ITO film similarly to the first light transmitting conductive film 4a.

The first light transmitting conductive film 4a is formed as a plurality of diamond-shaped regions in the inputting region 2a, and such diamond-shaped regions configure pad portions 211a and 212a or large area portions of the input position detecting electrodes 21, of first electrodes 211 and second electrodes 212. The pad portions 211a and 212a are arrayed alternatively in the X direction and the Y direction. Those of the pad portions 211a which are positioned adjacent each other in the X or first direction are connected to each other through a connecting portion 211c, and a pad portion 211a and a connecting portion 211c configure a first electrode 211 which extends in the X direction. In contrast, while the pad portions 212a configure second electrodes 212 extending in the Y or second direction, those of the pad portions 212a which are positioned adjacent each other in the Y direction, that is, portions overlapping with the connecting portions 211c form disconnection portions 218a.

The interlayer insulating film 23 is formed over the overall inputting region 2a. The interlayer insulating film 23 has contact holes 23a formed therein. The contact holes 23a are formed at positions at which they overlap with end portions of the pad portions 212a opposing through the disconnection portions 218a. On the upper layer side of the interlayer insulating film 23, the second light transmitting conductive film 4b is formed as repeating electrodes 215 in a region thereof overlapping with the contact holes 23a.

In the touch panel 1 configured in such a manner as described above, the first electrodes 211 and the second electrodes 212 are formed from the same conductive film, that is, from the first light transmitting conductive film 4a, and besides extend in directions crossing with each other. Therefore, crossing portions 218 at which the first electrodes 211 and the second electrodes 212 cross with each other exist on the glass cover 90. Here, the first electrodes 211 from between the first electrodes 211 and the second electrodes 212 extend in a mutually connected relationship in the X direction through the connecting portions 211c formed from the second light transmitting conductive film 4b also at the crossing portions 218. In contrast, the second electrodes 212 have the disconnection portions 218a configured at the crossing portions 218 thereof. However, at the crossing portions 218, the repeating electrodes 215 are formed in the upper layer of the interlayer insulating film 23. The repeating electrodes 215 electrically connect those of the pad portions 212a, which are adjacent each other with the disconnection portions 218a interposed therebetween, to each other through the contact holes 23a of the interlayer insulating film 23. Therefore, the second electrodes 212 extend in the Y direction in a state in which they are electrically connected to each other in the Y direction. It is to be noted that, since the repeating electrodes 215 overlap with the connecting portions 211c with the interlayer insulating film 23 interposed therebetween, there is no possibility that they may be short-circuited to each other.

In the present embodiment, the peripheral wiring lines 27 are formed from the first light transmitting conductive film 4a on the second face 90b side of the glass cover 90, and the input position detecting electrodes 21, that is, the first electrodes 211 and the second electrodes 212, and the peripheral wiring lines 27 are electrically connected in a one-by-one corresponding relationship to each other.

In the present embodiment, on the second face 90b side of the glass cover 90, the top coat layer 96 made of a photosensitive resin or the like is formed on the upper layer side of the second light transmitting conductive film 4b. The top coat layer 96 is formed over the overall area of the inputting region 2a.

Configuration of the Light Blocking Print Layer 93 and the Colored Print Layer 94

In the touch panel 1 of the present embodiment, the peripheral wiring lines 27 are formed from the first light transmitting conductive film 4a similarly to the input position detecting electrodes 21. Therefore, the peripheral wiring lines 27 cannot be observed from the inputting operation face side, that is, from the first face 90a side.

In a region of the second face 90b side of the glass cover 90 which overlaps with the overlapping region of the flexible circuit board 35 and the glass cover 90, the light blocking print layer 93 of a block color is formed on the lower layer side with respect to the peripheral wiring line 27, that is, to the first light transmitting conductive film 4a side. The light blocking print layer 93 is formed over a region greater than that of the overlapping region of the flexible circuit board 35 and the glass cover 90. Therefore, the mounting terminals 24 formed from end portions of the peripheral wiring lines 27 and the flexible circuit board 35 can be electrically connected to each other, and the overlapping portion between the flexible circuit board 35 and the glass cover 90 is not visible as viewed from the inputting operation face side, that is, from the first face 90a side.

Further, since the colored print layer 94 of a black color is formed in the peripheral region 2b, the touch panel 1 is excellent in outward appearance when viewed from the inputting operation face side, that is, from the first face 90a side. Here, the colored print layer 94 covers the area in which the flexible circuit board 35 and the glass cover 90 overlap with each other from the opposite side to the side on which the glass cover 90 is positioned, that is, from the upper layer side. Further, the colored print layer 94 overlaps with end portions of the light blocking print layer 93 without interposing the flexible circuit board 35 therebetween. Further, the light blocking print layer 93 and the colored print layer 94 have the same color, and in the present embodiment, both of the light blocking print layer 93 and the colored print layer 94 are a print layer of a black color. Therefore, although, when the touch panel 1 is viewed from the inputting operation face side, that is, from the first face 90a side, both of the light blocking print layer 93 and the colored print layer 94 are visible, the light blocking print layer 93 and the colored print layer 94 look as an integral printed region. Therefore, the touch panel 1 is superior in outward appearance when it is viewed from the inputting operation face side, that is, from the first face 90a side.

In the touch panel 1 configured in such a manner as described above, the thickness of the light blocking print layer 93 is smaller than that of the colored print layer 94. More particularly, the thickness of the colored print layer 94 is greater than 10 μm, for example, is 30 to 50 μm while the thickness of the light blocking print layer 93 is smaller than 10 μm.

Input Position Detection Method

In the touch panel 1 configured in such a manner as described above, if a position detection signal in the form of a rectangular pulse is outputted to an input position detecting electrode 21, then if no capacitance is parasitic on the input position detecting electrode 21, then a signal of a waveform same as that of the position detection signal applied to the input position detecting electrode 21 is detected. On the other hand, if a capacitance is parasitic on the input position detecting electrode 21, then distortion in waveform is caused by the capacitance, and therefore, it can be detected whether or not a capacitance is parasitic on the input position detecting electrode 21. Accordingly, if a finger is positioned in the proximity of any of the input position detecting electrodes 21 on the first face 90a side of the glass cover 90, that is, on the inputting operation face side, then the capacitance at the input position detecting electrode 21 in the proximity of which the finger is positioned increases by an amount corresponding to the capacitance generated between the input position detecting electrode 21 and the finger. Therefore, the electrode in the proximity of which the finger is positioned can be specified.

Manufacturing Method of the Touch Panel 1

FIGS. 4A to 4E and 5A and 5B illustrate a manufacturing method of the touch panel 1 according to the embodiment 1 of the present application. It is to be noted that the left half in FIGS. 4A to 5B corresponds to the sectional view shown in FIG. 3A while the right half corresponds to the sectional view shown in FIG. 3B.

Figure 4A:
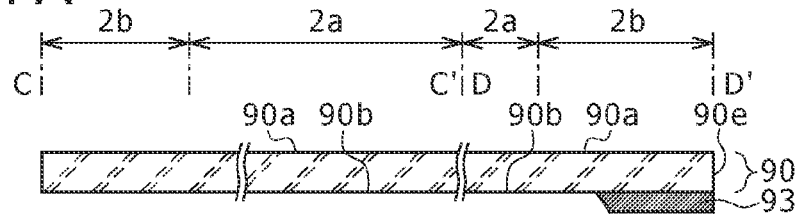
FIGS. 4A to 4E and 5A to 5B are schematic sectional views illustrating different steps of a manufacturing method of the touch panel of FIGS. 1A and 1B.
Figure 4B:
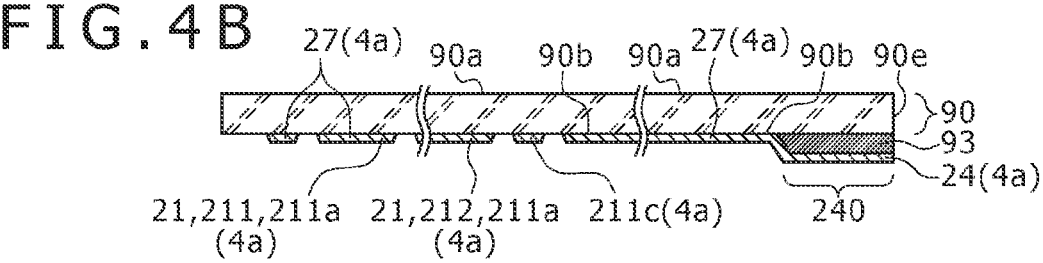

In manufacture of the touch panel 1 of the present embodiment, a glass cover 90 made of optically tempered glass is prepared as seen in FIG. 4A, and then a light blocking print layer 93 of a black color is formed only in a partial region of the second face 90b side of the glass cover 90 along the end portion 90e of the glass cover 90 at a first printing step illustrated in FIG. 4B. The formation region of the light blocking print layer 93 is a region in which a mounting region 240 is to be configured at a later step and which overlaps with an overlapping region between the flexible circuit board 35 and the glass cover 90. Here, the formation region of the light blocking print layer 93 is a little greater than the overlapping region between the flexible circuit board 35 and the glass cover 90, and the thickness of the light blocking print layer 93 is smaller than 10 μm.

Figure 4C:
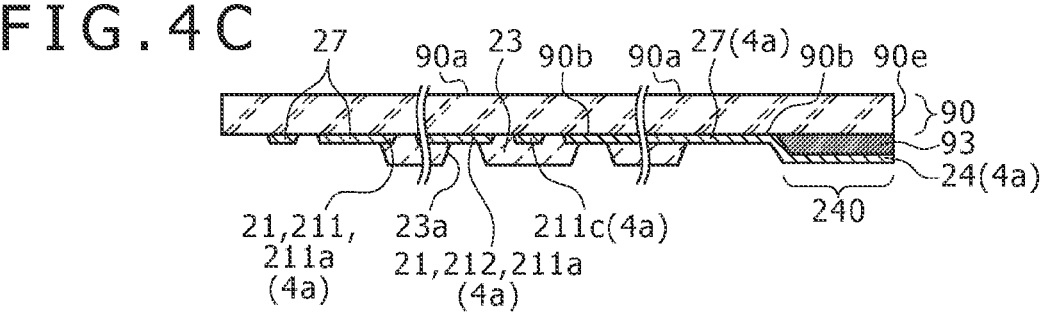
Figure 4D:
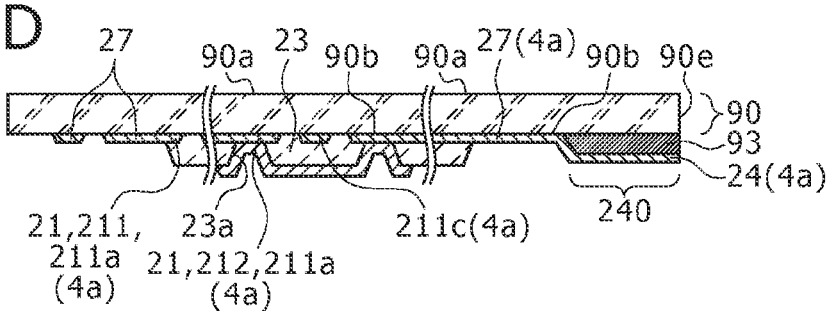

Then, at an electrode forming step illustrated in FIGS. 4B to 4D, a film forming step, an patterning step and so forth are carried out repetitively for the second face 90b side of the glass cover 90 to form a first light transmitting conductive film 4a, an interlayer insulating film 23 and a second light transmitting conductive film 4b. More particularly, first at a first light transmitting conductive film forming step illustrated in FIG. 4B, a film forming step and a patterning step of an ITO film are carried out for the second face 90b of the glass cover 90 to form a first light transmitting conductive film 4a from which input position detecting electrodes 21 and peripheral wiring lines 27 are to be configured. Then, at an interlayer insulating film forming step illustrated in FIG. 4C, an interlayer insulating film 23 having contact holes 23a therein is formed. Here, in the case where the interlayer insulating film 23 is formed from a silicon oxide film, a film forming step and a patterning step of a silicon oxide film are carried out, but in the case where the interlayer insulating film 23 is formed from a photosensitive resin, an application step and an exposure and development step of the photosensitive resin are carried out. It is to be noted that the interlayer insulating film 23 is formed over a substantially overall area of the inputting region 2a but is not formed in the peripheral region 2b. Then, at a second light transmitting conductive film forming step illustrated in FIG. 4D, a film forming step and a patterning step of an ITO film are carried out to form a second light transmitting conductive film 4b from which repeating electrodes 215 are to be configured.

Figure 4E:
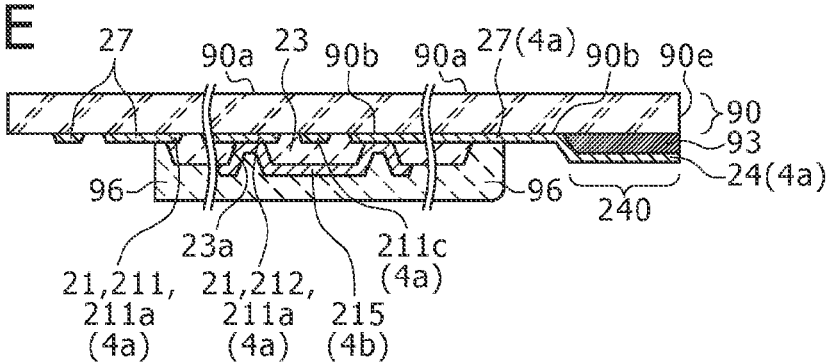

Then at a top coat layer forming step illustrated in FIG. 4E, a resin application step and a solidification step are carried out for the second face 90b side of the glass cover 90 to form a top coat layer 96. Here, the top coat layer 96 is formed over an overall area of the inputting region 2a but is not formed in the peripheral region 2b.

Figure 5A:
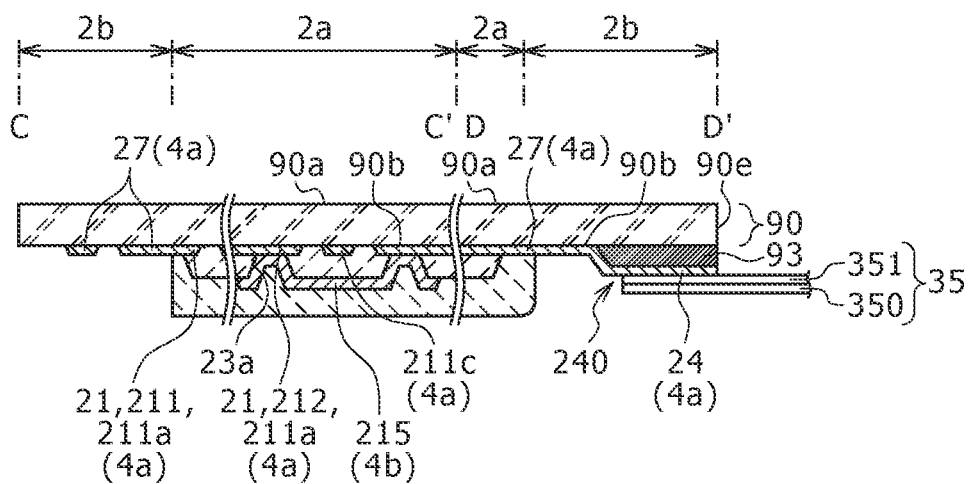

Then at a mounting step illustrated in FIG. 5A, a flexible circuit board 35 is connected to the mounting region 240. More particularly, the flexible circuit board 35 has a structure that a conductive layer 351 is formed on an insulating base film 350, and the conductive layer 351 is electrically connected at end portions thereof to the mounting terminals 24 formed from end portions of the peripheral wiring lines 27 through solder, an anisotropic conductor film, conductive paste or the like.

Figure 5B:
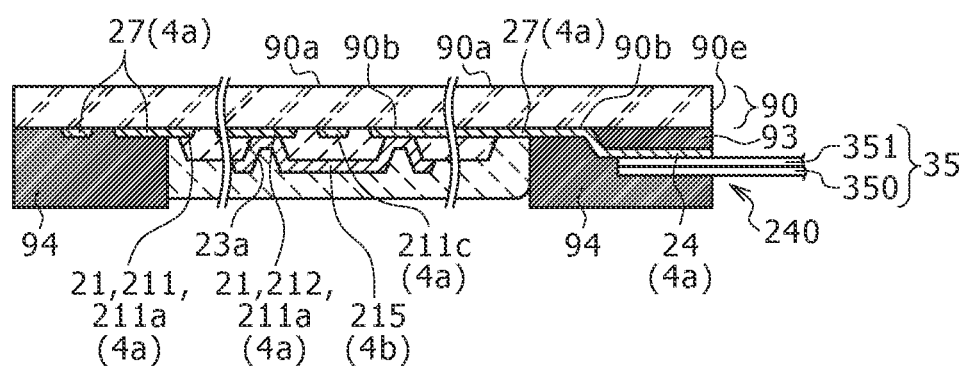

Then at a second printing step illustrated in FIG. 5B, a colored print layer 94 of a black color is formed in the peripheral region 2b. Thereupon, the colored print layer 94 is formed such that it covers the portion of the flexible circuit board 35, which overlaps with the glass cover 90, on the opposite side to the side on which the glass cover 90 is positioned. The thickness of the colored print layer 94 is greater than 10 μm, for example, is 30 to 50 μm.

Principal Effects of the Present Embodiment

As described above, according to the touch panel 1 and the manufacturing method for the same of the present embodiment, the input position detecting electrodes 21 and the peripheral wiring lines 27 are formed on the second face 90b side of the glass cover 90 opposite to the inputting operation face side, and the structure wherein the input position detecting electrodes 21 and the peripheral wiring lines 27 are formed on a glass substrate separate from the glass cover 90 is not used. Therefore, reduction of the number of parts by omission of the glass substrate can be achieved, and reduction in thickness and weight of the touch panel 1 can be anticipated.

Further, although the flexible circuit board 35 is connected to the second face 90b side of the glass cover 90, the light blocking print layer 93 which overlaps with the entire overlapping region of the flexible circuit board 35 and the glass cover 90 is formed on the lower layer side of the peripheral wiring line 27. Therefore, the flexible circuit board 35 is not visible from the inputting operation face side, that is, from the first face 90a side, of the glass cover 90, and consequently, the touch panel 1 is good in outward appearance.

On the other hand, while, on the second face 90b side of the glass cover 90, the colored print layer 94 is formed in the peripheral region 2b, the colored print layer 94 is formed on the upper layer side of the peripheral wiring line 27. Therefore, when the first light transmitting conductive film 4a which configures the input position detecting electrodes 21 and the peripheral wiring lines 27 is formed, what is formed on the glass cover 90 is only the light blocking print layer 93 from between the light blocking print layer 93 and the colored print layer 94. Further, the light blocking print layer 93 is formed at a narrow portion which overlaps with the overlapping region between the flexible circuit board 35 and the glass cover 90. Therefore, when the first light transmitting conductive film 4a is formed, outgas to be generated from the print layer can be suppressed to the minimum, and consequently, the first light transmitting conductive film 4a can be formed with high transparency. More particularly, when the first light transmitting conductive film 4a in the form of an ITO film is to be formed, in the case where no print layer exists at all, the transmission factor of the first light transmitting conductive film 4a is equal to or higher than 92%. However, if the print layer exists over the overall area of the peripheral region 2b, then the transmission factor of the first light transmitting conductive film 4a drops to 86 to 88%. However, in the present embodiment, when the first light transmitting conductive film 4a is to be formed, since the light blocking print layer 93 as a print layer is formed only in the narrow region, the transmission factor of the first light transmitting conductive film 4a is 89 to 91%. Therefore, the presence of the input position detecting electrodes 21 does not stand out, and when an image is to be displayed through the touch panel 1, it can be displayed with high quality.

Further, in the present embodiment, the thickness of the light blocking print layer 93 is smaller than that of the colored print layer 94 and smaller than 10 μm. Therefore, when the first light transmitting conductive film 4a is to be formed, outgas to be generated from the light blocking print layer 93 can be suppressed to a small amount, and consequently, the first light transmitting conductive film 4a of a high transmission factor can be formed. Further, while the peripheral wiring lines 27 are swollen from the light blocking print layer 93, since the thickness of the light blocking print layer 93 is small, there is an advantage that an offset cut or disconnection of wiring lines arising from the light blocking print layer 93 becomes less likely to occur.

Further, since part of the colored print layer 94 overlaps with the light blocking print layer 93, the entire inputting region 2a can be used as a formation region for the colored print layer 94 or the light blocking print layer 93, and a gap is not generated between the colored print layer 94 and the light blocking print layer 93. Therefore, the outward appearance of the touch panel 1 can be improved.

Further, the colored print layer 94 covers a portion of the flexible circuit board 35 which overlaps with the glass cover 90, and the colored print layer 94 is formed after the flexible circuit board 35 is mounted. Therefore, there is no possibility that the colored print layer 94 may be deteriorated by heat when the flexible circuit board 35 is mounted.

Further, since the glass cover 90 is formed from tempered glass, the thickness of the glass cover 90 can be reduced to approximately 0.2 mm. Therefore, the touch panel can be configured with a reduced thickness and weight.

Embodiment 2

Figure 6A:
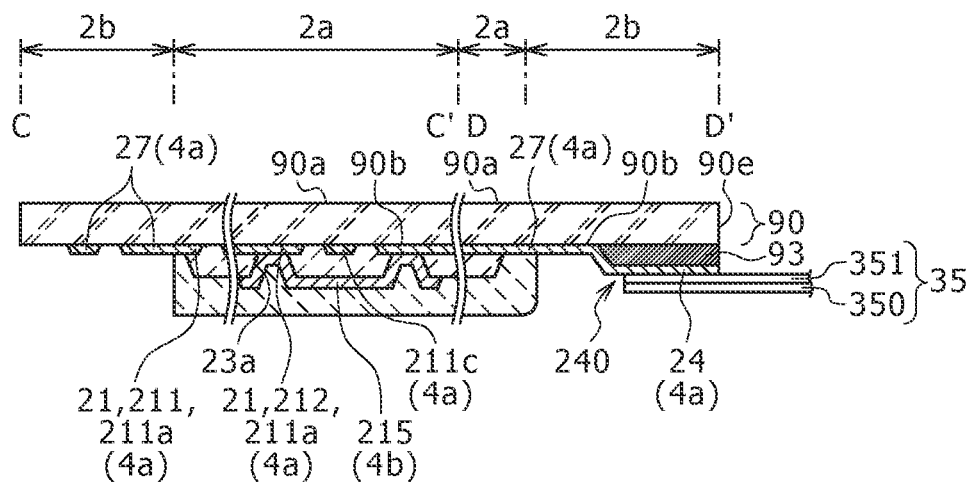
FIGS. 6A and 6B are schematic sectional views showing a touch panel according to an embodiment 2 of the present application.
Figure 6B:
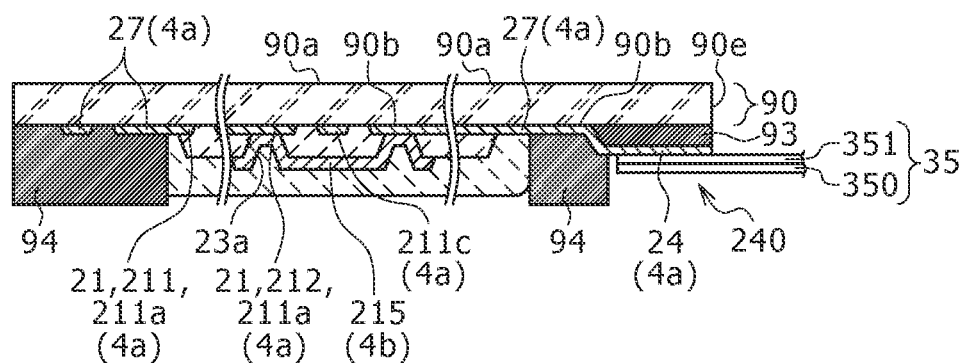

FIGS. 6A and 6B show a touch panel 1 according to an embodiment 2 of the present application. It is to be noted that, since a basic configuration of the touch panel 1 of the present embodiment is similar to that of the touch panel 1 of the embodiment 1, like elements are denoted by like reference characters and overlapping description of them is omitted herein to avoid redundancy.

While, in the embodiment 1 described hereinabove, the colored print layer 94 covers the entire region of the flexible circuit board 35 which overlaps with the glass cover 90, a different configuration may be adopted wherein the colored print layer 94 overlaps but partially with the light blocking print layer 93 without overlapping with the flexible circuit board 35. More particularly, at a second printing step illustrated in FIG. 6B after a flexible circuit board 35 is mounted on a glass cover 90 at a mounting step illustrated in FIG. 6A, a colored print layer 94 is formed in such a manner as to partially overlap with the light blocking print layer 93 without overlapping with the flexible circuit board 35. Also in the case where such a configuration as just described is adopted, substantially similar effects to those by the embodiment 1 can be anticipated.

Embodiment 3

Figure 7A:
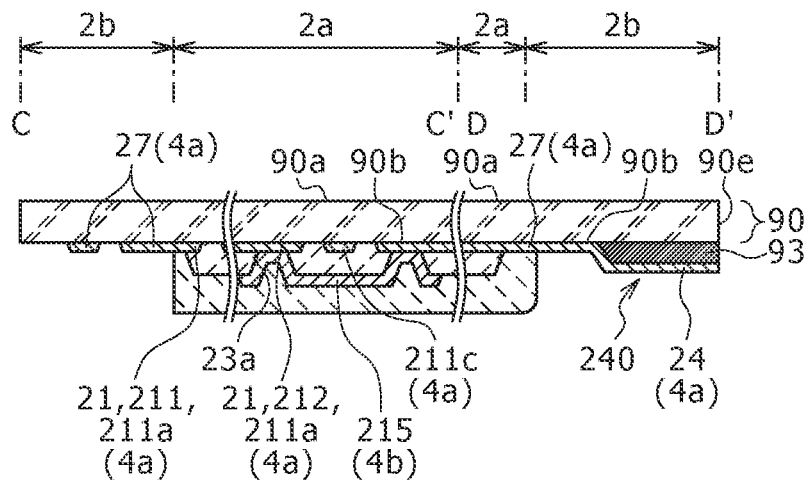
FIGS. 7A to 7C are schematic sectional views showing a touch panel according to an embodiment 3 of the present application.
Figure 7B:
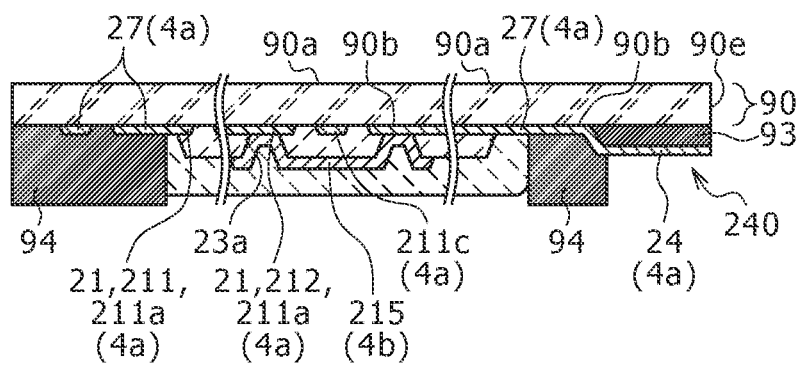
Figure 7C:
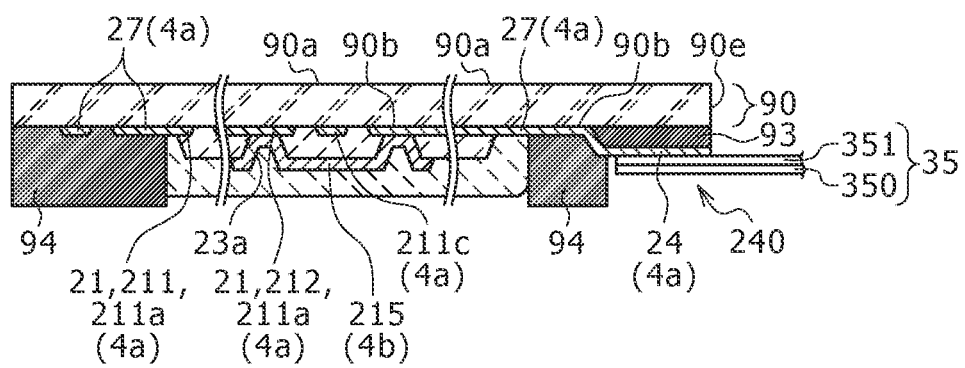

FIGS. 7A to 7C show a touch panel 1 according to an embodiment 3 of the present application. It is to be noted that, since a basic configuration of the touch panel 1 of the present embodiment is similar to that of the touch panel 1 of the embodiment 1, like elements are denoted by like reference characters and overlapping description of them is omitted herein to avoid redundancy.

While, in the embodiments 1 and 2 described hereinabove, the colored print layer 94 is formed after the flexible circuit board 35 is mounted on the glass cover 90, the flexible circuit board 35 may be mounted on the glass cover 90 after the colored print layer 94 is formed. More particularly, at the second printing step illustrated in FIG. 7B after the top coat layer forming step illustrated in FIG. 7A, the colored print layer 94 is formed in such a manner as to overlap with an end portion of the light blocking print layer 93. Then, at the mounting step illustrated in FIG. 7C, the flexible circuit board 35 is mounted on the glass cover 90. Also in the case where such a configuration as just described is adopted, substantially similar effects to those by the embodiment 1 can be anticipated.

Other Embodiments

While, in the embodiments described above, the input position detecting electrodes 21 and the peripheral wiring lines 27 are configured from a common light transmitting conductive film, that is, from the first light transmitting conductive film 4a made of ITO, the input position detecting electrodes 21 may be configured from the first light transmitting conductive film 4a of ITO while the peripheral wiring lines 27 may be a separate light transmitting conductive film made of, for example, IZO. Meanwhile, the input position detecting electrodes 21 may be configured from the first light transmitting conductive film 4a of ITO while the peripheral wiring lines 27 may be a light transmitting conductive film formed from a multilayer film of IZO/Au (gold)/IZO or a light transmitting conductive film formed from a multilayer film of ITO/Au (gold)/ITO. Such multilayer films can reduce the wiring line resistance of the peripheral wiring lines 27.

While, in the embodiments described hereinabove, the input position detecting electrodes 21 are formed from the first light transmitting conductive film 4a and the repeating electrodes 215 are formed from the second light transmitting conductive film 4b, the present application may be applied to a different touch panel wherein the repeating electrodes 215 are formed from the first light transmitting conductive film 4a and the input position detecting electrodes 21 are formed from the second light transmitting conductive film 4b.

While, in the embodiments described above, a liquid crystal apparatus is used as the image production apparatus 5, alternatively an organic electroluminescence apparatus may be used as the image production apparatus 5.

Examples of Incorporation into Electronic Equipment

Figure 8A:
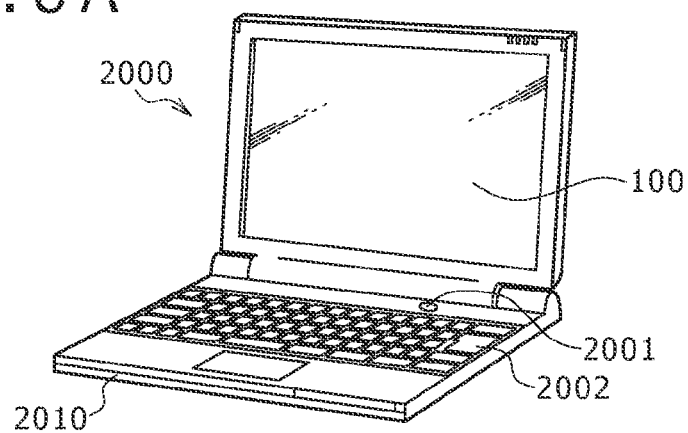
FIGS. 8A to 8C are schematic perspective views showing different electronic equipments which include an electro-optical apparatus with an inputting function to which the present application is applied.
Figure 8B:
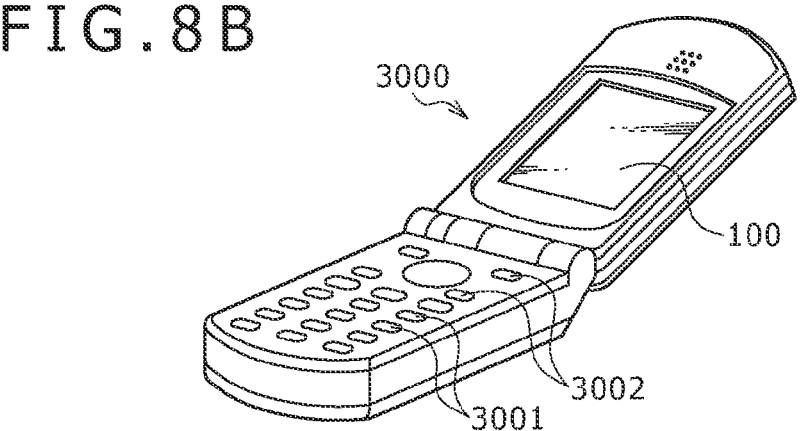
Figure 8C:
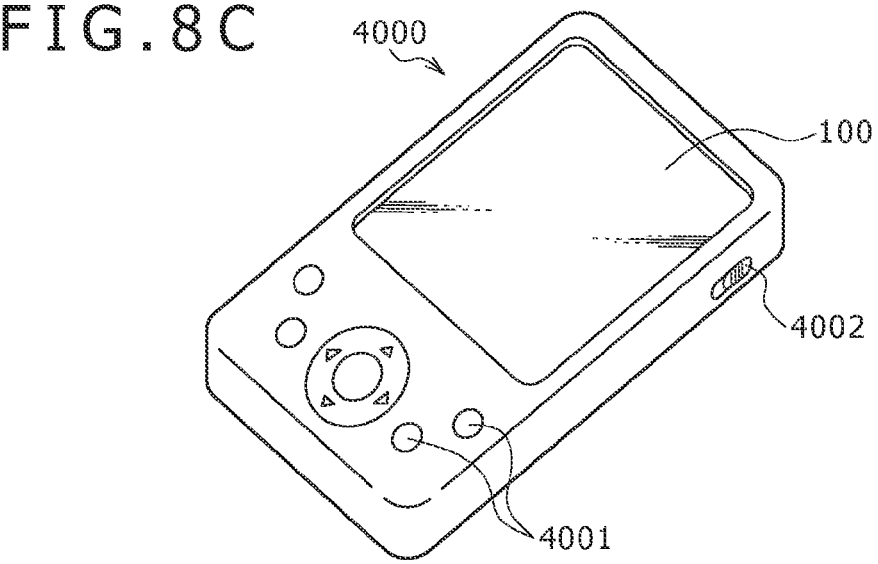

Electronic equipments wherein the electro-optical apparatus 100 with an inputting function according to the embodiments described hereinabove are applied are described. FIGS. 8A to 8C show electronic equipments which include the electro-optical apparatus 100 with an inputting function to which the present application is applied. In particular, FIG. 8A shows a configuration of a personal computer of the mobile type which includes the electro-optical apparatus 100 with an inputting function. Referring to FIG. 8A, the personal computer 2000 shown includes an electro-optical apparatus 100 with an inputting function as a display unit and a main body section 2010. The main body section 2010 includes a power supply switch 2001 and a keyboard 2002. FIG. 8B shows a configuration of a portable telephone set which includes an electro-optical apparatus 100 with an inputting function. Referring to FIG. 8B, the portable telephone set 3000 includes a plurality of operation buttons 3001, a scroll button 3002, and an electro-optical apparatus 100 with an inputting function as a display unit. If the scroll button 3002 is operated, then a screen image displayed on the electro-optical apparatus 100 with an inputting function is scrolled. FIG. 8C shows a configuration of a personal digital assistant (PDA) to which the electro-optical apparatus 100 with an inputting function is applied. Referring to FIG. 8C, the personal digital assistant 4000 includes a plurality of operation buttons 4001, a power supply switch 4002 and an electro-optical apparatus 100 with an inputting function as a display nit. If the power supply switch 4002 is operated, then various kinds of information such as an address book, a schedule table and so forth are displayed on the electro-optical apparatus 100 with an inputting function.

It is to be noted that the electro-optical apparatus 100 with an inputting function can be applied not only to the electronic equipments described above with reference to FIGS. 8A to 8C but also to various other electronic equipments including a digital still camera, a liquid crystal television set, a video tape recorder of the viewfinder type or the monitor direct-view type, a car navigation apparatus, a pager, an electronic notebook, a desk-top calculator, a word processor, a work station, a visual telephone set, a POS terminal and a bank terminal. The electro-optical apparatus 100 with an inputting function described above can be applied as a display section of such various electronic equipments.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A touch panel, comprising:
a glass cover having a first face side and a second face side, the first face side being an inputting face side and the second face side being opposite to the first face side;
a light transmitting conductive film formed on the second face side of said glass cover, the light transmitting conductive film configuring an input position detecting electrode in an inputting region;
a flexible circuit board electrically connected to an end portion of a peripheral wiring line in a mounting region existing in a peripheral region;
a first light blocking layer formed between the glass cover and the peripheral wiring line in the peripheral region so as to overlap the mounting region when viewed from the first face side of the glass cover; and
a second light blocking layer formed on the second face side of said glass cover so as to sandwich the peripheral wiring line between the first light blocking layer and the second light blocking layer in the mounting region.

2. The touch panel according to claim 1, wherein said first light blocking layer has a thickness smaller than that of said second light blocking layer.

3. The touch panel according to claim 1, wherein said first blocking layer has a thickness smaller than that of 10 μm.

4. The touch panel according to claim 1, wherein said second light blocking layer partially overlaps with said first light blocking layer.

5. The touch panel according to claim 4, wherein said second light blocking layer covers a portion of said flexible circuit board which overlaps with said glass cover.

6. The touch panel according to claim 4, wherein said second light blocking layer partially overlaps with said first light blocking layer without overlapping with said flexible circuit board.

7. The touch panel according to claim 1, wherein said glass cover is made of tempered glass.

8. An electro-optical apparatus comprising:
an image production apparatus; and
a touch panel,
wherein the touch panel includes
a glass cover having a first face side and a second face side, the first face side being an inputting face side and the second face side being opposite to the first face side,
a light transmitting conductive film formed on the second face side of said glass cover, the light transmitting conductive film configuring an input position detecting electrode in an inputting region,
a flexible circuit board electrically connected to an end portion of a peripheral wiring line in a mounting region existing in a peripheral region,
first light blocking layer formed between the glass cover and the peripheral wiring line in the peripheral region so as to overlap the mounting region when viewed from the first face side of the glass cover, and
a second light blocking layer formed on the second face side of said glass cover so as to sandwich the peripheral wiring line between the first light blocking layer and the second light blocking layer in the mounting region.

* * * * *